United States Patent [19]

Cann

[11] E Patent Number: Re. 32,918

[45] Reissued Date of Patent: May 9, 1989

[54] HEATER/EMITTER ASSEMBLY

[75] Inventor: Gordon L. Cann, Irvine, Calif.

[73] Assignee: Technion, Inc., Irvine, Calif.

[21] Appl. No.: 930,101

[22] Filed: Nov. 13, 1986

Related U.S. Patent Documents

Reissue of:

[64] Patent No.: 4,569,198
Issued: Feb. 11, 1986
Appl. No.: 735,301
Filed: May 17, 1985

U.S. Applications:

[63] Continuation of Ser. No. 474,478, Mar. 11, 1983, abandoned.

[51] Int. Cl.[4] ..... F02K 11/00; H05B 1/00

[52] U.S. Cl. ..... 60/203.1; 313/43

[58] Field of Search ..... 60/203.1, 202; 313/42, 313/43, 45

[56] References Cited

U.S. PATENT DOCUMENTS

| | | | |
|---|---|---|---|
| 598,639 | 2/1898 | McElroy . | |
| 1,120,966 | 12/1918 | Neiman . | |
| 1,290,930 | 1/1919 | Devers, Jr. | 313/42 |
| 1,861,098 | 5/1932 | Smith | 313/43 |
| 2,087,735 | 7/1937 | Pirani et al. | 313/42 |
| 2,410,063 | 10/1946 | Hansen et al. | 313/42 |
| 2,414,581 | 12/1943 | Buritz et al. . | |
| 2,471,424 | 10/1944 | Glauber . | |
| 2,521,364 | 9/1950 | Haller | 313/42 |
| 2,688,707 | 9/1954 | Eitel et al. . | |
| 2,723,363 | 11/1955 | de Santis et al. . | |
| 2,810,849 | 10/1957 | Agule | 313/45 |
| 2,996,643 | 8/1961 | Johnstone et al. . | |
| 2,999,358 | 9/1961 | Zwick . | |
| 3,013,169 | 12/1961 | Gungle et al. | 313/42 |
| 3,056,060 | 9/1962 | Langer | 313/42 |
| 3,059,429 | 10/1962 | Bjerklie et al. . | |
| 3,087,083 | 4/1963 | Katz | 313/42 |
| 3,149,460 | 9/1964 | La Rocca . | |
| 3,255,375 | 6/1966 | Ward . | |

(List continued on next page.)

FOREIGN PATENT DOCUMENTS 2010406A 6/1979 United Kingdom .

OTHER PUBLICATIONS

Bruun, E. R., "Monopropellant Thruster Performance Augmentation Heater Development Program", 1980 Joint Army/Navy/NASA/Air Force (JANNAF) propulsion Meeting, Monterey, Calif., Mar., 1980, vol. IV, DTIC #ADA 131716.

(List continued on next page.)

*Primary Examiner*—Donald E. Stout
*Attorney, Agent, or Firm*—Sherman & Shalloway

[57] ABSTRACT

A heater/emitter for a rocket engine assembly utilizes a resistance heated wire coil or coils which may also function as a cathode emitter or as a thermal driver for an auxiliary emitter. This heater/emitter may if desired be formed into a bifilar and may be supported by the wire lead itself or by isolated supports. The power leads are located in a lead channel and feature an overwrapping of similar wire material which reduces the internal resistance heating of the lead to increase the electrical conductivity of the supporting lead and increase the thermal conduction thereof to establish a cooler and structurally-stronger lead. A plurality of radiation discs or shields are spaced along the leads to further minimize energy losses from the heater out of the lead channel. The heater/emitter itself is enclosed, except for the lead channel, by a heat exchanger housing. The function of this housing is to accept energy from the hot heater coil and in turn transfer that energy to a fluid flowing through the heat exchanger. Power is transferred from the hot heater coil to the heat exchanger firstly by means of radiation heat transfer, and secondly by impingement of thermionic electrons accelerated thru a potential imposed between the emitter and the heat exchanger. This packaging approach permits radiation transfer efficiencies, from coil to heat exchanger, of 90 to 95 percent. The thermionic electron emission and acceleration efficiency approaches 100 percent. The dual energy transfer mode permits single device operation over wider power ranges and thrust levels than would be permitted by single mode devices. The device may be operated in the single mode as a radiation transfer heater or as a combination radiator and emitter, or may function with the principal energy transfer being in the emitter mode only.

38 Claims, 5 Drawing Sheets

U.S. PATENT DOCUMENTS

| | | | |
|---|---|---|---|
| 3,519,865 | 7/1970 | Weston | 313/43 |
| 3,533,233 | 10/1970 | Fiedler et al. . | |
| 3,737,714 | 6/1973 | Theodosopoulos et al. . | |
| 3,956,885 | 5/1976 | Davis et al. . | |
| 4,288,982 | 9/1981 | Kuenzly et al. . | |
| 4,322,946 | 4/1982 | Murch et al. | 60/203.1 |

OTHER PUBLICATIONS

Bruun, E. R. et al., "Final Report—Monopropellant Thruster Performance Augmentation Heater Development Program", AFRPL-TR-80-73, Feb. 1981, DTIC #ADB 057191.

"Electron-Magnetic-Field Interactions in the Electron Bombardment Heated Thruster," K. E. Starner, et al., AIAA Journal, vol. 4, No. 6, pp. 1090-1093, 1965.

"Electron Bombardment Heating for Electrothermal Propulsion," K. E. Starner, et al., AIAA Journal, vol. 3, No. 1, Jan., 1965.

"Life Test Summary and High Vacuum Tests of 10 MLB Resistojets," Ronald Y. Yoshida, et al., the Marquardt Company, Van Nuys, California.

"Performance Testing of a 3kW Hydrogen Resistojet," J. A. Donovan, et al., Rocket Propulsion Establishment, Westcott, Aylesbury, Bucks, England.

"Fabrication and Preliminary Testing of a 3kW Hydrogen Resistojet," J. A. Donovan, et al., AIAA Paper No. 72449, 1972.

"Flight Qualification of the Augmented Electrothermal Hydrazine Thruster," Dressler, et al., AIAA Paper No. 81,1410, 1981.

HEATER/EMITTER ASSEMBLY

Matter enclosed in heavy brackets [ ] appears in the original patent but forms no part of this reissue specification; matter printed in italics indicates the additions made by reissue.

This application is a continuation of application Ser. No. 474,478, filed Mar. 11, 1983, now abandoned.

This invention relates to a heater/emitter assembly and its construction. The heater/emitter assembly is particularly adaptable for use in a rocket engine for spacecraft or orbital satellites in which a propellant is heated in a heat exchanger, which is in turn heated by the heater/emitter assembly prior to the propellant being expelled from the thruster.

In spacecraft application, it is often required to have on-board propulsion to help final-position a satellite to an on-orbit station, to maintain this positioning against orbit decay and orbit plane drifts such as those of the north-south or east-west type and/or to maneuver the vehicle to new stations, positions or formations. The efficiencies by which these operations are performed which affects the amount of weight carried by the vehicle necessary to obtain the required propulsive performance, is critical to the usefulness of the spacecraft. The less weight required, or the higher the propulsive efficiency, or combinations thereof will generally result in gains in payload capability of the spacecraft. Typically many spacecraft have some "waste" electrical energy available. If this energy is efficiently converted to thermal energy and transferred to a propellant it may be possible to augment or improve the propulsive performance of a rocket engine or thruster. Critical with all such systems is the requirement also for high reliability. Within the context of this application, a heater/emitter used to enhance or increase propulsive performance of a rocket engine or thruster must have a high degree of efficiency, both in converting electrical energy into heat and in transferring the heat to the propellant, and must be able to repeat its function reliably throughout the duration of the mission of the vehicle.

One important potential source of energy loss in the form of heat loss is through the power leads and supporting structure of the system used to convert electrical energy into thermal energy. In the case of a heater element using externally supplied electrical power, there are heat losses through the supply conductors and supporting structure. These losses can be reduced if the support structure for the heater element is the same structure as the electrical lead-in conductors for the heater element. The lead-in conductors and additional supports, if used, are contained by a supporting structure. Heat loss occurs as a result of heat being transferred from high temperature leads to the supporting structure.

In that there will occur some amount of heater element motion due to "sag" effects (heater motion due to its own mass in the presences of a gravitational field) or "squirm" (resulting from internal material stresses or gain growth), the heater element must have some freedom of movement without contacting the structure or some other portion of the heater. In some cases these effects are sufficiently strong that the heater will require additional supplemental supports. In general, these supports cannot be insulators as such materials tend to degrade the heater element and adversely affect operating life.

Another constraint on heater design is the desire to match the heater surface area and operating temperature to the energy transfer requirements. Maximum overall efficiency suggests that this be accomplished with the voltage and current capability of the spacecraft with minimum use of power conditioning.

For these reasons, it is important to provide a heater system which is made more efficient. It is an object of the invention to provide a heater system which is made reliable by such techniques as redundancy, without unduly sacrificing efficiency. It is a further object of the invention to provide a heater system which, while exhibiting high degrees of strength and stability and having a redundancy feature, is electrically and thermally efficient. It is a further object to provide a heater system which takes advantage of the unique vacuum environment characteristic of extraterrestrial space.

SUMMARY OF THE INVENTION

This invention relates to an electric power converter in the form of a heater assembly and/or thermionic emitter such as may be used in a propulsion rocket for a spacecraft. The heater/emitter assembly will be located within a surrounding cavity which forms the interior wall of a heat exchanger. This cavity will only be open at one end for the electric power lead access. As such, the heat exchanger will intercept all radiation and emission from the heater/emitter except that which is lost through the heater/emitter lead channel. The heat transferred to the heat exchanger is then transferred to the propellant, augmenting or increasing its propulsive efficiency. Most spacecraft have excess electric power capacity. In most cases it is possible to utilize this excess capacity for increasing propulsive performance. The benefits gained, however, are in direct proportion to the efficiency of the energy transfer process. The basic subject matter of this invention relates to an efficient power converter that is able to reliably and efficiently transfer energy to a propulsion rocket heat exchanger.

Typically the heater/emitter itself extends from at least two parallel leads and will usually include a center support. A heater will in the preferred embodiment included coiled sections which may be formed as two helixes. The heater may be redundant with a common lead which is formed by the interwrapping of a lead from each coiled section. This common lead may also be located so as to form a common center support for the coiled sections. The coil supporting leads pass through a plurality of radiating discs or shields which are arranged perpendicularly to the leads. These shields serve to help reduce the radiant energy being lost through the heater lead channel by reflecting this radiant energy back into the heavy cavity. One arrangement of the heater comprises forming two coils in helixes, interlaced so as to form a bifilar, with the center support section extending along a center axis of the bifilar. In order to further strengthen the leads thereof, additional wire is wrapped around the lead wires from the two helixes. This increases the electrical conductivity of the lead, thereby reducing the internal resistance heating of the lead, as well as providing a structurally stronger lead. This arrangement also increases the thermal conduction of the lead, and while it contributes to some increase in lead thermal loss, it helps to establish an increased thermal gradient in the lead permitting attachment and thus contact with lower temperature materials and insulators. Tubes may be placed over the wrapped lead wires to provide further rigidity. A first power source is connected between the heater leads to supply power to heat the double helix coil. In the instance of redundant coils with a common center lead, dual power sources are used, both with a connection to the common center lead and then a separate connection to respective coil leads.

A method which increases the radiation transfer capability of a heater is accomplished by coating, plating or thermochemically processing the heater surface so that an increased surface emissivity is obtained. The increased surface emissivity results in higher energy transfer at a given temperature, or permits a lower heater temperature for a surface-treated heater to transfer comparable power as that of an untreated surface. The later case may result in extended heater life as well as greater overall system efficiency.

A further feature comprises adding to the radiation energy transfer process a thermionic electron emission process. A high temperature radiating heater element will emit electrons, acting as an emitting cathode in the presence of an appropriate voltage potential. In spacecraft usage the space between the heater and the intercepting cavity wall, now also functioning as an anode, is at a vacuum, making electron transfer possible. Dimensionally, the separation is such that this transfer will occur with voltages that are acceptable for spacecraft use, i.e. $\leqq 100$ volts. Application of a second power source between the radiating heater and the surrounding cavity results in energy transfer that will occur with an efficiency approaching 100 percent, whereas the radiation transfer is limited to efficiencies of about 90 to 95 percent. This dual transfer mode capability greatly extends the power transfer capability of the heater, which is typically limited due to packaging volume, coil surface area, and material temperature limits.

To enhance the emission, the coil material may include materials such as thoria. An alternate approach is to use a separate emitter which is heated to emission temperatures by the coil heater. The duality permits heater assembly packaging and power level modeling to meet a number of flight condition variables. The dual operating mode makes it possible not only to use a device over a wide range of propellant flow rates, but also to permit dual mode, high and low thrust, from a single engine.

The invention also allows optional selection or use of either the radiative or emissive mode; i.e., with all or a high percentage of the power transfer being accomplished by either radiation transfer or by emission. This feature permits device use under flight conditions that could be prohibitive for a radiation-only configuration. Under the "g" field associated with a spin-stabilized spacecraft, a self-supporting radiation heater may be unacceptably distorted due to "sag" effects from the spinning environment. With the dual mode configuration, the radiation heater may be appreciably shortened and sufficiently supported to preclude "sag." As such the heater would be unable to transfer by radiation sufficient power for useful thruster augmentation. However, it can operate as an emitter, or can heat an auxilliary emitter to operating temperatures for sufficient useful power transfer.

The unpowered temperature resistance of the heater is lower than the operating temperature resistance by factors of 5 to 10. When such a heater is powered by an unregulated power supply, typical peak currents of 5 to 10 times the operating current may result. To circumvent this problem without use of an additive weight active power controller (with resulting vehicle payload weight loss) the invention incorporates the option to include a passive semiconductor device in series with the heater element. Either of two characteristics of the semiconductor may be used. A semiconductor having a negative temperature coefficient can initially (at unpowered heater temperature) have a resistance comparable to the hot resistance of the heater load. This limits the peak current to values less than the operating current. As the heater is activated, the leads, lead supporting structure and the in-line semiconductor increase in temperature. With a semiconductor having a thermal coefficient of resistivity approximately inverse that of the heater, the resistance sum will be nearly constant over the temperature range. The second method would use the forward blocking voltage characteristic of a semiconductor, such as a silicon diode, which is temperature-sensitive. When used in this mode the diode would block the higher current from flowing in the circuit until the temperature of the load (heater element), and in turn the diode, increased to a sufficient level that there would be enough load (heater element) resistance to limit any undesirable current surge. At this condition, wherein the temperature of the diode has exceeded the level where the forward blocking voltage has collapsed, the diode then becomes passive as along as the temperature remains at the high level, and therefore, does not contribute to any significant power loss. This intentioned exposure of the semiconductor to large temperature change is atypical and in contrast to standard applications where the element is usually heat-sinked to control and limit its operating temperature so that these particular features will not occur.

BRIEF DESCRIPTION OF THE DRAWINGS

The accompanying drawings show present exemplary embodiments of this invention in which.

DETAILED DESCRIPTION OF THE PREFERRED EMBODIMENTS

Figure 1:
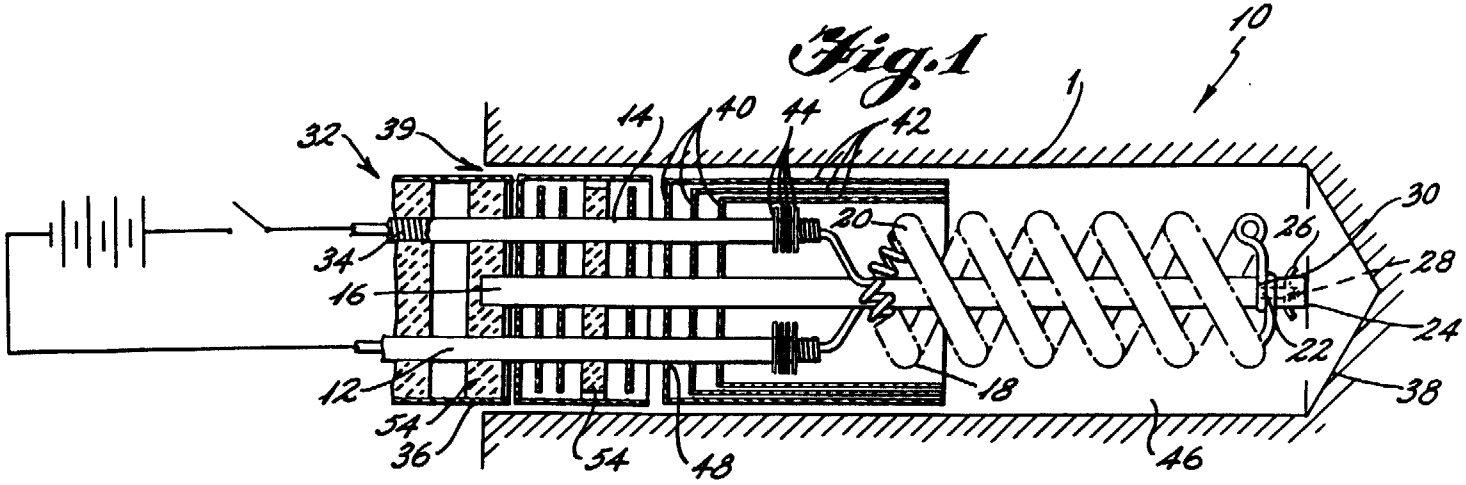
FIG. 1 shows a sectional view of a single element radiation heater/emitter assembly according to the invention.

Referring to FIG. 1, the heater/emitter assembly 10 is mounted on a thruster 1 and comprises an elongate structure, in which two conductors 12, 14 and a center post 16, support heater filament elements 18, 20. As can be seen, the heater element 18,20 is constructed to two coiled wire segments that are bifilar wound starting at separate conductors 12,14 and connecting at a midpoint 22 to supporting isolated center post 16. The coil wire 18,20 is held in place on the supporting post 16 with a retaining cap 24 which is locked in place with the center post 16 by a retaining pin 26 extending through hole 28 in stepped portion 30 of post 16. Each lead conductor is made of several sections corresponding with temperature transition from the high temperature radiating heater or emitting cathode to the cold, less than 100° C., connection to a power supply (not shown). For simplicity, only one section of the lead system is shown in FIG. 1. The radiating coil-emitter wire forming the helixes 18,20 includes a portion that is not coiled that extends in straight line paths away from the coiled portion until it reaches a lower temperature zone 32 where the temperature is less than 1000° C. This straight wire is a section of the power lead conductor. This section of straight wire is overwrapped with a wire 34 of similar diameter. The overwrapping wire 34 on the straight lead wire results in an increase in electrical and thermal conduction of this section, reducing the resistance heating and establishing a thermal gradient between the radiating coils 18,20 and the next connecting lead section (not shown) and base supporting structure 36. The overwrap coil 34 also provides increased structural support of the heater coil to further strengthen the heater/emitter support.

The bifilar heating filament provides the primary source of heat from the heater assembly 10. In order to enhance the transfer of heat from the filament coils 18,20 the filament coils 18,20 can be coated or surface processed to produce high-emissivity surface, thereby maximizing the transfer of thermal energy from the filament coils 18,20 to a heat exchanger cavity wall 38. Additionally, the heat exchanger cavity wall 38 can have a high emissivity coating or surface processing. The use of the high emissivity surface permits a greater transfer of power for any given temperature or alternatively, reduces the temperature required to obtain a certain amount of power transfer. In operation, for a given amount of current, a faster warm-up time is also obtained by the use of the high emissivity surface. Advantageously, the emissivity with an optimum coating or surface treatment is expected to be 0.85 or greater, with 1.0 being perfect emissivity and 0 being perfect reflectivity. In operation, the heat exchanger cavity wall 38 has a large geometric view as compared to the heater coils 18,20 or center post 16 and, therefore, intercepts a high percentage of the radiation emitted by the heater coils 18,20.

To reduce the amount of radiant energy that would be lost out of the power lead-heater support channel 39 (an area defined as the plane of an opening in the heat exchanger cavity wall 38), radiation shields 40, 42 and 44 are located to intercept and reflect this energy back into the heater cavity 46 and focus this energy toward the forward end of cavity 46, where most of the energy will be intercepted subsequently by the heat exchanger cavity wall 38. This embodiment of the invention illustrates an arrangement of a number of reflective discs, nine shown, spaced along the power lead-heater support channel. Each metallic disc 40 has cut-outs 48 to allow passage therethrough without contacts by the lead connectors 12, 14. These discs are supported in the structure by a plurality of rods 50 (FIG. 6) anchored in the insulator segment discs 40. Short tungsten springs 52 are mounted over the four support posts 50 and placed between the discs 40. These springs accurately position the discs axially and permit thermal expansion without inducing excessive stresses in any component. In order to accurately position the discs axially a predetermined compression is induced in all springs during assembly. The length of these springs can vary along the channel 39 in which the discs are mounted in order to improve the efficiency of the radiation shielding. To reduce radial outflow of radiation, reflecting cylinders 42 are attached to several of the discs 40. A plurality of smaller discs 44 are included on the lead connector to block radiation leakage through the cut-outs 48 in the larger radiation discs 40 wherein the gap is provided for non-contact passage of the lead connectors 12 and 14. This embodiment of radiation shields permits a radiation transfer efficiency to the wall 38 of 90 to 95 percent. It is noted that this configuration of radiation shielding members 40, 42 and 44 isolates insulator segment discs 54 from high radiation fluxes existing in the cavity 46. Insulators tend to decompose under the normal gap operating temperatures and if exposed thereto would tend to poison the heater elements 18, 20. Thus, the shields 40, 42 and 44 perform dual functions: (1) reflection of energy, and (2) isolation of insulator discs 54 from the cavity 46.

Figure 2:
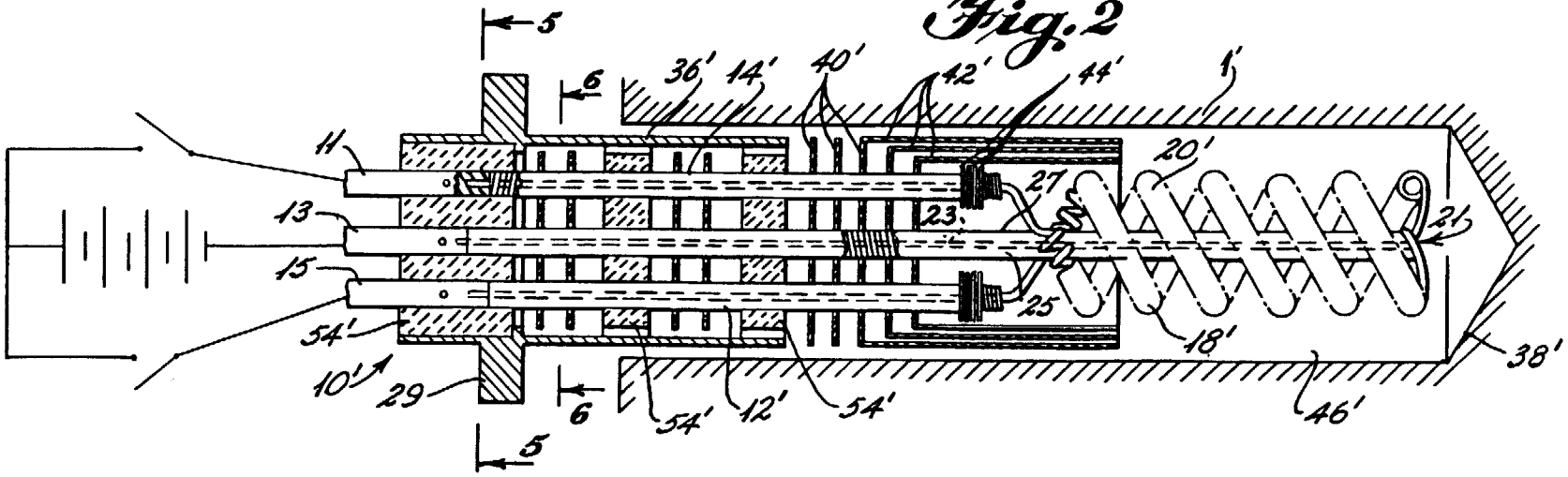
FIG. 2 is a sectional view of a radiation heater/emitter in a redundant assembly.

Reference is now made to FIG. 2 (wherein like elements are given like primed reference numerals) which illustrates the heater/emitter redundancy option of this invention as mounted in thruster 1 which is designated generally by the reference numeral 10'. In this embodiment, the heater element coils 18' and 20' are of similar configuration and support as in the embodiment illustrated in FIG. 1. The basic difference in the redundancy option is that the coil segments 18' and 20' are formed of separate wire elements with one lead from each converging at 21. At this junction, the two leads 18' and 20' are interwrapped over a third wire 23 and the combination of the wires 18', 20' and 23 forms a common power lead 25 for the two individual coil segments. The redundancy option can be expanded to include additional (more than 2) heaters/emitters. This embodiment permits the individual heater coils 18' and 20' to be powered singularly for redundancy operation or simultaneously for higher power operation. This latter feature makes it possible to step level control of the power to be transferred without the use of external power conditioning while maintaining lower power operation redundancy. The common interwrapped lead 25 with a covering tube 27 also functions as a heater support eliminating the need for additional supporting structure (with its additional heat loss) in the heater/emitter cavity 46'. An important aspect of this invention is the fact that by these arrangements no joint is used on the heater or its leads within the high temperature zone. A typical interconnecting intermediate lead conductor 11 designed to be effective in temperatures less than 1000° C. is shown connected to connector 14'. Similar lead conductors are shown as conducting posts or rods 13, 15 attached to heater leads 12' and 25 supported by insulated segments 54'. A further aspect of this invention is that by these arrangements, as in the FIG. 1 embodiment, no insulated segment or insulator is used in the high temperature zone. This lead structure 11, 13, 15 subsequently transitions to a flexible lead (not shown in FIG. 2) which in turn couples to the power supply (not shown in FIG. 2). A mounting flange 29 couples the heater/emitter assembly to the heat exchanger, maintaining a predetermined spacing therebetween.

The coiled heater segments 18, 18', 20, 20' of FIGS. 2 or 2 operating at radiating temperatures in excess of 2000° C. will emit electrons in the presence of a voltage potential. By establishing a potential between the heat exchanger cavity wall 38, 38' and the radiating coils 18, 18' and 20, 20', electrons will be thermionically emitted from the coils (functioning in this mode as a cathode) and be received by the cavity wall (not functioning as anode 38, 38'). In operation, the gap 46 between the coils (cathode) 18, 18' and 20, 20', and the wall is a near vacuum.

Figure 3:
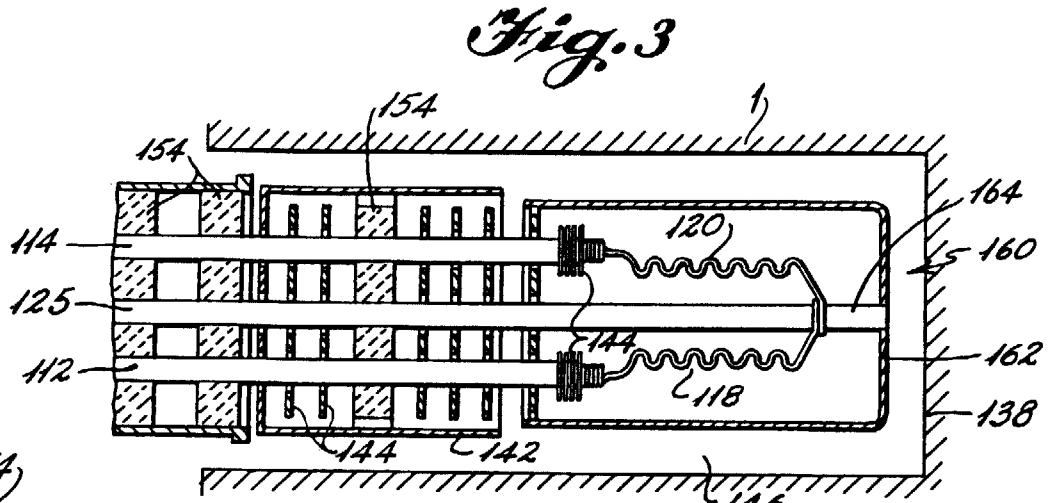
FIG. 3 is a sectional view of a "g" field and shock resistive radiation heater with an auxiliary emitter.

Alternate embodiments may be used to enhance the emission energy transfer process. An exemplary embodiment 100 illustrative of this emphasis is shown as mounted in thruster 1 in FIG. 3. Here, the coils 118 and 120 are shown as simple coils supported by a center post cathode lead connector 125. If desired the coils 118, 120 could be helixes like those of FIGS. 1–2. The heater leads 112 and 114 are similar to those illustrated previously in FIGS. 1 and 2. This heater embodiment allows operation in relatively high force fields, that is, 5 "g"s without detrimental sag. In this illustration the center post cathode lead connector 125 supports a cylinder-disc cathode 160. The cathode 160 is fabricated to conform with the shape of the heat exchanger anode cavity wall 138, however the gap 146 therebetween may be designed with selected minimum spacing, i.e., a smaller gap at the disc end 162 of the cathode for preferential energy transfer at a specific predetermined zone of heat exchanger anode 138. FIG. 3 illustrates an embodiment wherein a relatively large surface area cathode emitter 160 would be used for the primary mode of energy transfer and the radiation heater 118, 120 would be used to heat the cathode 160 and anode 138 to emission temperature conditions. The radiation heater 118,120 can also be configured to augment or serve as a backup device to transfer energy by radiation to heat exchanger 138. In a typical embodiment, the emitter cathode 160 will be adequately supported by a bracket or brackets 164 to maintain gap 146 distance. This may be a common support with the radiation heater (as shown) or may be separately supported (FIG. 4).

Figure 4:
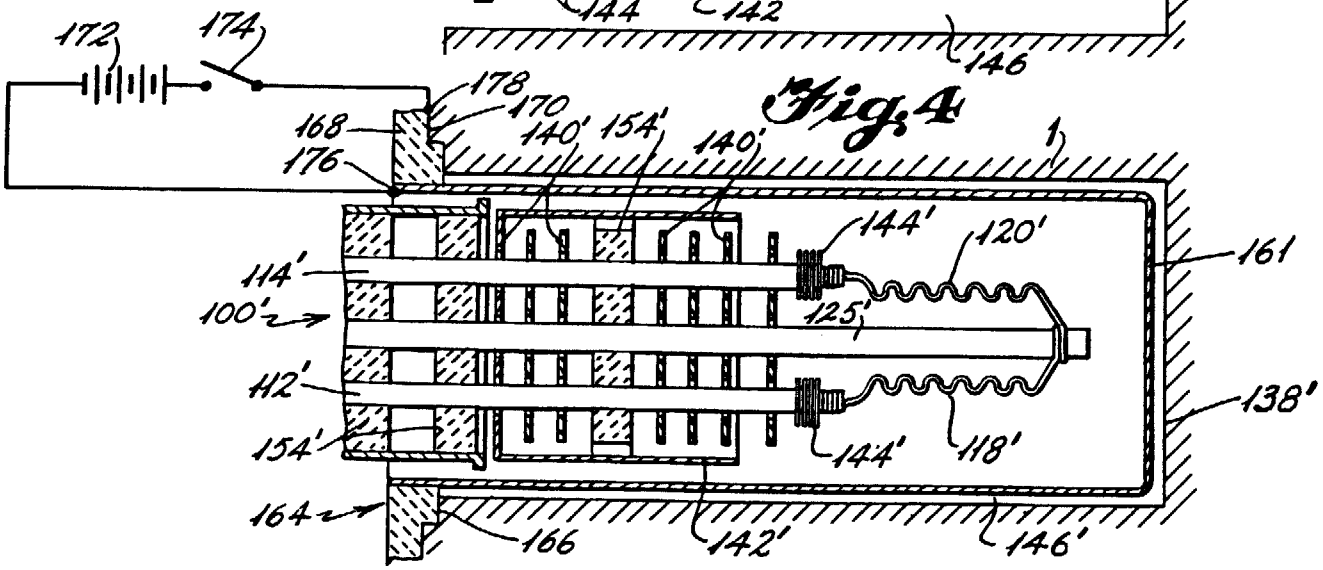
FIG. 4 shows a modification of the heater of FIG. 3.

Referring now to FIG. 4, the details of the separate support are shown (with like elements represented with like primed reference numerals). In this embodiment, the heater 100'mounted in thruster 1 includes elements 140', 142', 144', 118', 120', 125' and 154' substantially the same as the corresponding elements referred to with unprimed numbers in FIG. 3. In this embodiment the heat exchanger 138' includes an open end 164 with a stepped annular portion 166 formed thereon. Cylinder-disc cathode 161 has rigidly mounted at an open end thereof an insulation disc 168 which includes a annular portion 170 corresponding, in dimension, to the stepped annular portion 166 of heat exchanger 138'. In assembly the insulator disc '168 is mounted on the open end of heat exchanger 138' with the annular portions 166, 170 interengaging to provide the sole support for the cathode 161. Additionally, this interengagement maintains the gap 146' within the required or predetermined tolerances both in the axial and radial directions. As further shown in FIG. 4, power supply 172 is connected through controllable switch 174 with the cathode at 176 and the heat exchanger-anode at 178.

Figure 6:
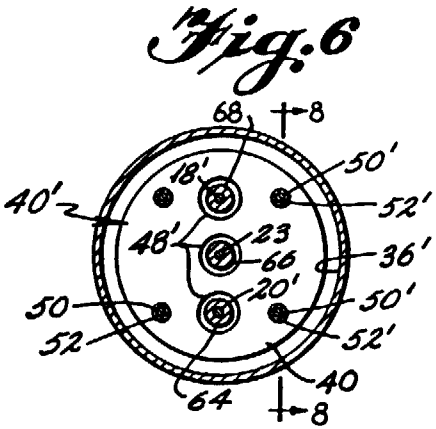
FIG. 6 shows a sectional view along the line 6—6 of FIG. 2.
Figure 5:
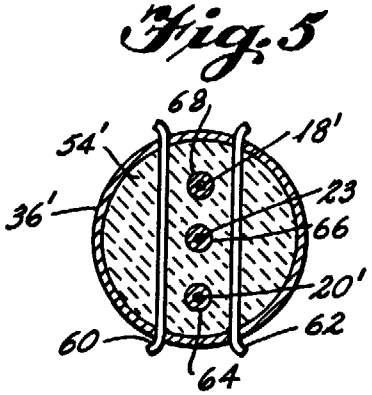
FIG. 5 shows a sectional view along the line 5—5 of FIG. 2.

FIGS. 5 and 6 shows sections taken of the FIG. 2 embodiment and will be described as such; however, the principles of FIGS. 5 and 6 are applicable to all of the embodiments. Referring to FIG. 5, supporting structure 36' is shown in surrounding relation to insulation disc 54'. Pins 60, 62 extend through structure 36' and retain disc 54' in position. Also shown in FIG. 5 are center connectors 20' 23 and 18' surrounded respectively by wrapping wires 64, 66 and 68.

Referring now to FIG. 6, elements 48' (openings in radiation shield 40), 50' (support posts) and 52' (tungsten springs) have already been described hereinabove. Also shown herein is a further section of supporting structure 36'.

Figure 7:
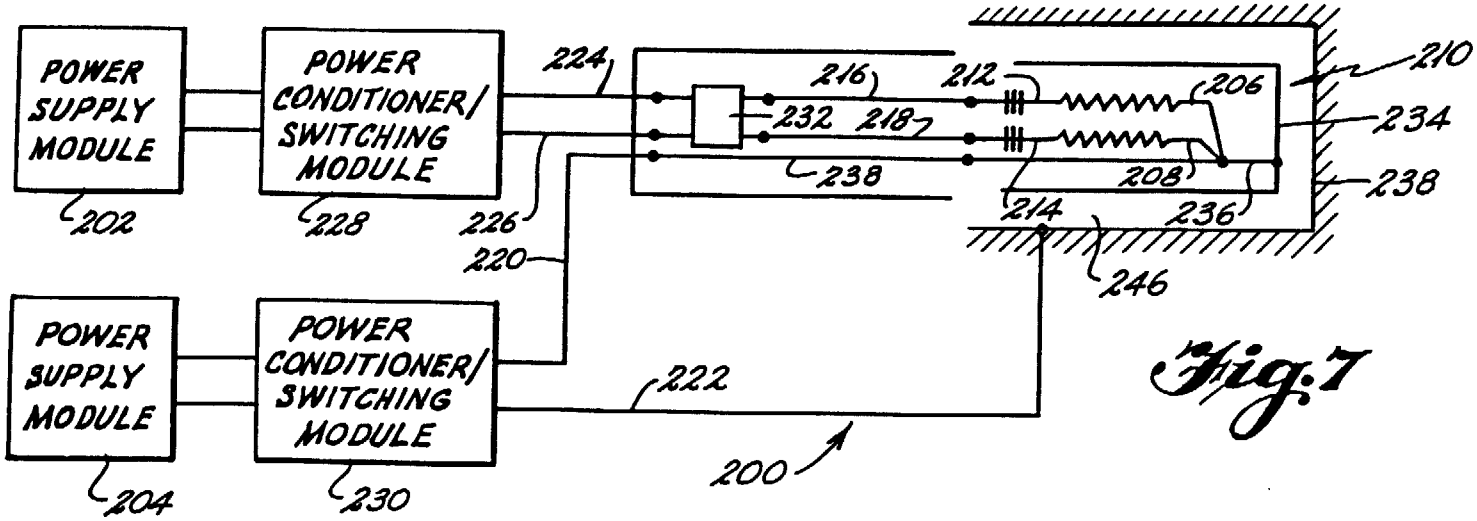
FIG. 7 illustrates schematically the relationship between a preferred device, power supplies and power control elements.
Figure 8:
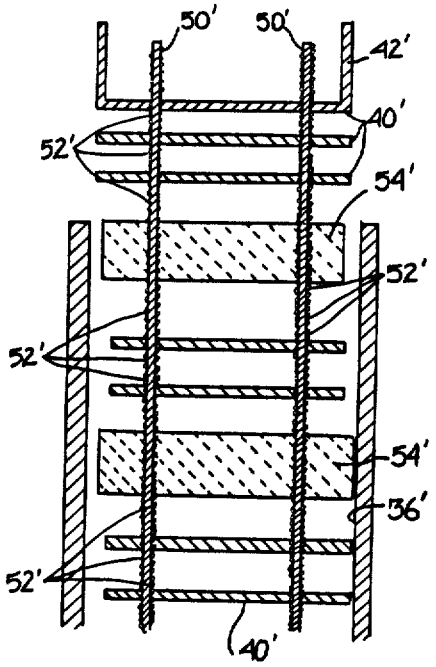
FIG. 8 shows a cross-sectional view along the line 8—8 of FIG. 6.
Figure 9:
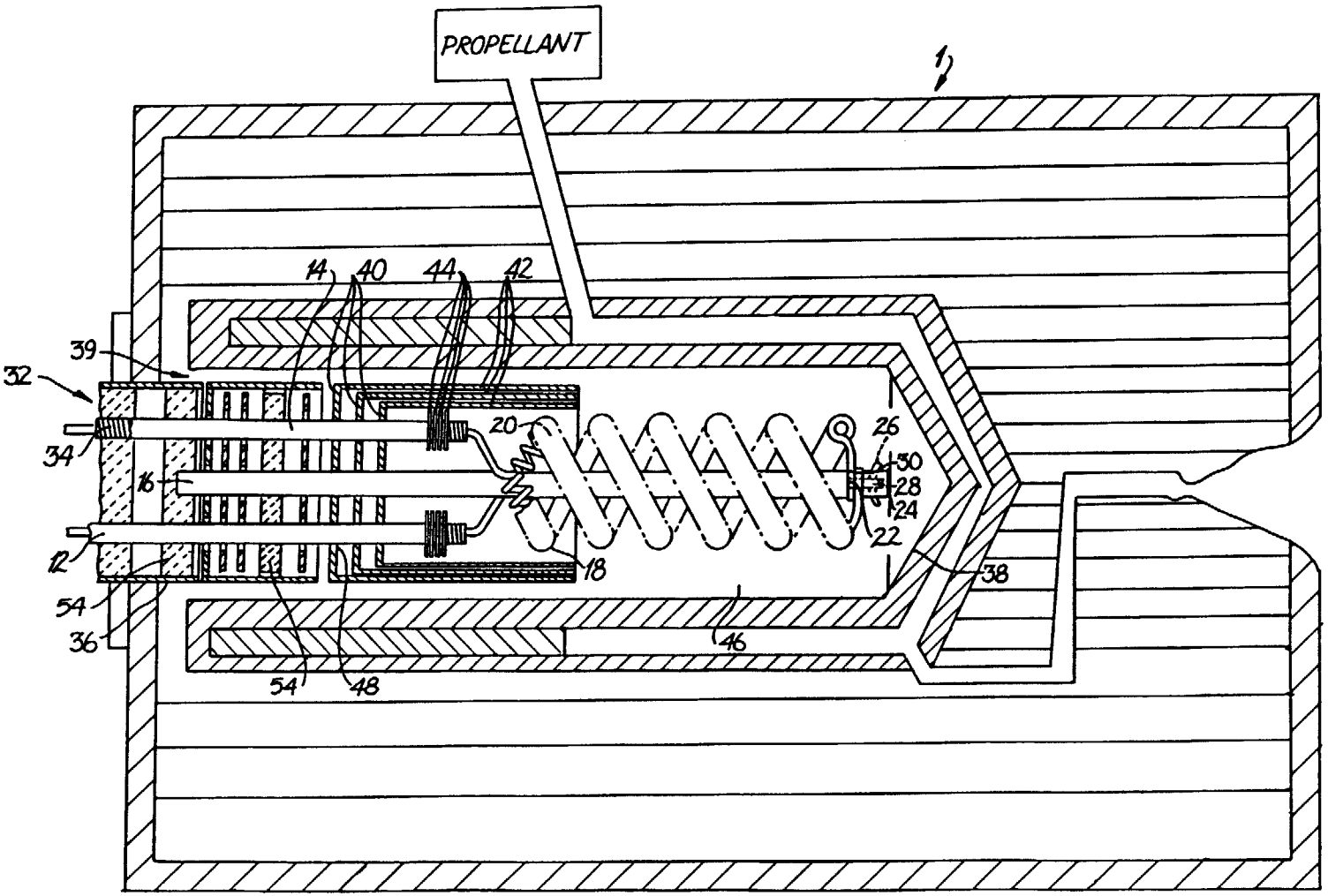
FIG. 9 shows a cross-sectional view of a thruster with the heater assembly of FIG. 1 assembled therewith.

FIG. 7 is a schematic illustration of the inventive power leads and associated power system 200. Typically, separate power supplies 202 and 204 will be used for the radiation heater 206, 208 and the thermionic converter 210 respectively. The several sections of lead section are denoted as follows: The straight wire lengths 212 and 214, the anchoring post leads 216 and 218 and the flexible leads 220, 222, 224, 226 to the power supplies 202, 204 through power conditioner/switching devices 230, 228. The power matching semiconductor 232 is used in the radiation heater circuit, and is connected to leads 216, 218 and flexible leads 224, 226. Power conditioning/switching module 228 may be limited if desired to only a switching control. The power leads to the cathode 234 include a supporting post lead 236, an anchoring post 238 and flexible lead 220 to the power supply-module 204, 230. The anode lead is a flexible lead 222.

Typical spacecraft power supplies operate in the range of 28–42 volts. At these voltages, the emitter is able to transfer useful power levels with gap spacings 246 of 0.010 to 0.020 inches. In the instance where the selected spacing 245 and emitter surface area are not sufficient to sustain the desired level of power to be transferred, spacecraft power conditioning may be included to increase the spacecraft voltage (power conditioning/switching module 230) During 500 watt power level operation with gap spacing 246 of greater than 0.020 inches 70 volts or greater will be required in the instance of an emitter surface area of about 20 $Cm^2$. The power conditioner portion of module 230 steps up the voltage in either fixed or variably controllable fashion with structure well known in the art to a voltage level which will result in the desired power output at cathode 234. The switching portion of the module 230 merely comprises an on-off switch. Table I shows experimental results achieved through variation of parameters of gap size, emitter surface area, voltage and current.

The power conditioner/switching module 228 performs somewhat different functions than the module 230. The switching portion thereof is the same as that of module 230; however, the power conditioning portion acts as a current limiter when the semiconductor 232 is not used in the circuit. When semiconductor 232 is used, the module 228 performs, solely, the on-off switching function.

Semiconductor 232, when provided, performs the above-noted current limiting function. When the heater is powered by an unregulated power supply, peak currents of 5 to 10 times the normal operating current may result. The semiconductor 232 has two characteristics either of which may be taken advantage of. Regarding a first characteristic, the semiconductor may have a negative temperature coefficient and in the unpowered heater temperature condition, will have a resistance comparable to the resistance of the heater at full load. Thus, as the heater is initially started, the semiconductor resistance limits the peak current and as the heater and semiconductor element temperature increases, the heater resistance increases in approximate relation to the decrease in semiconductor resistance with increased temperature, thus controlling peak currents in all modes of heater operation. Regarding a second characteristic, the semiconductor 232 may comprise a temperature sensitive silicon diode. In this case at low temperatures, high current would be blocked by the diode and by the time the semiconductor has reached a temperature sufficient to "disarm" this current limiting feature of the diode, the resistance of the heater would be sufficient to safely limit the current.

The various above-disclosed radiation shields which are are advantageously located in the lead channel are specifically located therein such that the temperature gradient between successive plates thereof, ideally, closely approximates the anticipated temperature gradient through the intermediate power leads (for example 212,214) during heater operation.

TABLE I

EMITTER OPERATING PARAMETERS

| Voltage (Volts) | Gap Spacing (inches) | Transmitted Power (Watts) | Emitter Area ($Cm^2$) |
|---|---|---|---|
| 40 | .015 | 300 | 10 |
| 40 | .015 | 1000 | 32 |
| 40 | .030 | 300 | 50 |
| 40 | .030 | 1000 | 120 |
| 100 | .015 | 300 | 2 |
| 100 | .015 | 1000 | 8 |
| 100 | .030 | 300 | 6 |
| 100 | .030 | 1000 | 25 |

It is anticipated that various changes may be made to the above-described preferred embodiments. For example, different geometric configurations for the filaments may be used with similar results. As such the scope of the invention is solely intended to be limited by the scope of the following claims.

The power level of the thermionic circuit is controlled by the gap spacing, the emitter area and the applied voltage, as shown in the following equation:

$$P = A^4/9\ \epsilon_0 \sqrt{\frac{2e}{m}}\ \frac{(\Delta V)^{5/2}}{(\Delta x)^2}$$

where:

P = total electric power transferred through the thermionic circuit.

A = surface area of emitter facing the heat exchanger.

$\Delta V$ = voltage drop between cathode emitter and heat exchanger.

$\Delta x$ = gap between emitter and heat exchanger.

$|e|$ = charge of the electron.

m = mass of the electron.

$\epsilon_O$ = permittivity of free space.

I claim:

1. In an apparatus for propelling an extraterrestrial vehicle with a propellant which is heated prior to discharge from a thruster of said vehicle, a heater apparatus comprising:

(a) a radiative heater element;

(b) at least two substantially parallel leads integrally connected to said heater element;

(c) support structure for supporting said at least two leads;

(d) housing structure including a closed end and an open end, said heater element being located in said closed end and said support structure being located in said open end, said housing structure comprising means for transferring heat from inside said housing structure to an area [ouside] *outside* said housing structure, said propellant being conducted adjacent said area; [and]

(e) radiation shielding means *comprising a plurality of thin wafers* mounted solely about said leads and closely spaced thereabout and located between said support structure and said heater element for redirecting radiation from said heater element in the direction of the closed end of said housing structure, *some of said thin wafers including substantially cylindrical reflectors attached to the outer periphery thereof and extending from said thin wafers in the direction of said heating element.*

2. The invention of claim 1, wherein said heater element comprises first and second sections each made of coiled wire and electrically connected together at a common area, each of said sections being electrically connected to one of said leads.

3. The invention of claim 2, wherein said apparatus further includes a support rod, said common area being located on said support rod, said support rod being supported by said support structure.

4. The invention of claim 2, wherein said first and second coiled wire sections are connected in series with a power source.

5. The invention of claim 2, wherein said at least two leads comprise three leads, a first lead connected to a first end of said first coiled section, a second lead connected to a first end of said second coiled section and a third lead including said common area, each of said first and second coiled sections including a second end connected to said common area.

6. The invention of claim 5, wherein a first power source is connected between said first and third leads and a second power source is connected between said second and third leads.

7. The invention of claim 2, wherein said first and second coiled wire sections are each further formed as a helix.

8. The invention of claim 4, wherein said first and second coiled sections are formed as helixes.

9. The invention of claim 5, wherein said first and second coiled sections are formed as helixes.

10. The invention of claim 5, wherein said third lead comprises interwrapped portions of said first and second coiled sections and a tube covering said interwrapped portions.

11. The invention of claim 4, wherein a further power source is connected between said first and second coiled sections and said housing structure, whereby when said first named power source raises said heater element to a predetermined temperature, activation of said further power source will cause emission of electrons from said heater element to said housing structure.

12. The invention of claim 11, wherein said further power source is connected with a polarity such that said heater element comprises a cathode and said housing structure comprises an anode.

13. The invention of claim 1, wherein said heater element and an inner wall of said housing structure include coatings formed thereon designed to increase the surface emissivity thereof.

14. The invention of claim 1, wherein said support structure comprises a plurality of insulating discs oriented substantially perpendicularly to said leads, said discs including holes for closely held receipt of said leads.

15. The invention of claim 14, wherein said radiation shielding means isolates said insulating discs from said heater element to thereby prevent decomposition of said insulating discs.

16. The invention of claim 1, wherein said [radiation shielding means comprises a plurality of] thin wafers each [including] *includes* holes formed therein for close passage therethrough of said leads.

17. The invention of claim 16, wherein said holes are slightly larger in diameter than the outer diameter of said leads whereby said wafers and leads are spaced apart to avoid direct heat transfer therebetween.

[18. The invention of claim 17, wherein some of said thin wafers include cylindrical reflectors attached to the outer periphery thereof and extending from said thin wafers in the direction of said heater element.]

19. The invention of claim [18] *1* wherein said leads each further include a plurality of thin discs rigidly attached thereto between said thin wafers and said heater element.

20. The invention of claim 2 wherein said first and second coiled sections each comprises a single continuous wire, extending from a location outside said support structure and housing structure to said common area.

21. A heater apparatus comprising:

(a) a radiative heater element;

(b) at least two substantially parallel leads integrally connected to said heater element;

(c) support structure for supporting said at least two leads;

(d) housing structure including a closed end and an open end, said heater element being located in said closed end and said support structure being located in said open end, said housing structure comprising means for transferring heat from inside said housing structure to an area outside said housing structure; [and]

(e) radiation shielding means *comprising a plurality of thin wafers* mounted solely about said leads and closely spaced thereabout and located between said support structure and said heater element for redirecting radiation from said heater element in the direction of the closed end of said housing structure, *some of said thin wafers including substantially cylindrical reflectors attached to the outer periphery thereof and extending from said thin wafers in the direction of said heating element.*

22. The invention of claim 21, wherein said heater element comprises first and second sections each made of coiled wire and electrically connected together at a common area, each of said sections being electrically connected to one of said leads.

23. The invention of claim 22, wherein said apparatus further includes a support rod, said common area being located on said support rod, said support rod being supported by said support structure.

24. The invention of claim 22, wherein said at least two leads comprise three leads, a first lead connected to a first end of said first coiled section, a second lead connected to a first end of said second coiled section and a third lead including said common area, each of said first and second coiled sections including a second end connected to said common area.

25. The invention of claim 22, wherein said first and second coiled wire sections are each further formed as a helix.

26. The invention claim 24, wherein said third lead comprises interwrapped portions of said first and second coiled sections and a tube covering said interwrapped portions.

27. the invention of claim 21, wherein said heater element and an inner wall of said housing structure include coatings formed thereon designed to increase the surface emissivity thereof.

28. The invention of claim 21, wherein said support structure comprises a plurality of insulating discs oriented substantially perpendicularly to said leads, said discs including holes for closely held receipt of said leads.

29. The invention of claim 28, wherein said radiation shielding means isolates said insulating discs from said heater element to thereby prevent decomposition of said insulating discs.

30. The invention of claim 21, wherein said [radiation shielding means comprises a plurality of] thin wafers each [including] *includes* holes formed therein for close passage therethrough of said leads.

31. The invention of claim 30, wherein said holes are slightly larger in diameter than the outer diameter of said leads whereby said wafers and leads are spaced apart to avoid direct heat transfer therebetween.

[32. The invention of claim 31, wherein some of said thin wafers include cylindrical reflectors attached to the outer periphery thereof and extending from said thin wafers in the direction of said heater element.]

33. The invention of claim 22, wherein said first and second coiled sections each comprises a single continuous wire, extending from a location outside said support structure and housing structure to said common area.

34. The invention of claim 21, further including a cathode mounted in said housing, and a first power supply connected between said leads; and (b) a second power supply connected between said cathode and said housing structure, whereby after said first power supply has caused said heater element to heat said cathode to a sufficient predetermined temperature, activation of said second power supply will cause emission of electrons from said electrode to said housing structure.

35. The invention of claim 34, wherein said first power supply and said second power supply comprise a single power supply means including:

(a) a first circuit connected to said heater element; and (b) a second circuit connected in parallel with said first circuit and to said cathode and said housing structure.

36. The invention of claim 35, wherein (a) said heater element comprises a plurality of coils;

(b) said support structure further includes a center part comprising a common negative terminal for said coils; and (c) said cathode is electrically connected to said center post.

37. The invention of claim 34, wherein said cathode is supported by said center post at two ends thereof.

38. The invention of claim 34, wherein said cathode is solely supported by a portion of said housing structure.

39. The invention of claim 38, wherein said cathode has integrally attached thereto an insulator, said insulator and said housing structure including interengaging portions ensuring accuracy in a spacing between said cathode and said housing structure.

40. The invention of claim 30, wherein said thin wafers are supported on a plurality of rods, and springs are provided on said rods between adjacent wafers to enable adjustment for wafer movement due to expansion and contraction of said rods.

* * * * *